(12) United States Patent
Åkerud

(10) Patent No.: US 11,500,990 B2
(45) Date of Patent: Nov. 15, 2022

(54) DETERMINING AN ORIGIN OF A TARGET SOURCE CODE FOR A COMPUTER PROGRAM OR A PART THEREOF

(71) Applicant: Fossid AB, Stockholm (SE)

(72) Inventor: Daniel Åkerud, Staffanstorp (SE)

(73) Assignee: Fossid AB, Stockholm (SE)

( * ) Notice: Subject to any disclaimer, the term of this patent is extended or adjusted under 35 U.S.C. 154(b) by 407 days.

(21) Appl. No.: 16/840,091

(22) Filed: Apr. 3, 2020

(65) Prior Publication Data
US 2021/0256130 A1    Aug. 19, 2021

(30) Foreign Application Priority Data
Feb. 14, 2020   (EP) .................................. 20157492

(51) Int. Cl.
 *G06F 16/2458*   (2019.01)
 *G06F 16/2457*   (2019.01)
 (Continued)

(52) U.S. Cl.
 CPC ............... *G06F 21/57* (2013.01); *G06F 8/70* (2013.01); *G06F 16/148* (2019.01);
 (Continued)

(58) Field of Classification Search
 CPC .. G06F 21/57; G06F 16/148; G06F 16/24578; G06F 16/335; G06F 16/34;
 (Continued)

(56) References Cited

U.S. PATENT DOCUMENTS

2010/0242028 A1   9/2010 Weigert
2019/0171985 A1*  6/2019 Ferranti ................. G06F 16/29
(Continued)

OTHER PUBLICATIONS

Katsuro Inoue et al., Where Does This Code Come From and Where Does it go? Integrated Code History Tracker for Open Source Systems, Jun. 2-9, 2012, [Retrieved on May 1, 2022], Retrieved from the internet: <URL: https://ieeexplore.ieee.org/stamp/stamp.jsp?tp=&arnumber=6227181> 11 Pages (331-341) (Year: 2012).*
(Continued)

*Primary Examiner* — Anibal Rivera
(74) *Attorney, Agent, or Firm* — Chernoff, Vilhauer, McClung & Stenzel, LLP

(57) ABSTRACT

A computer-implemented method for determining an origin of a target source code for a computer program or a part thereof. The method involves: Searching a plurality of software archives from different sources in a global computer network to find occurrences of the target source code among code files in said software archives. For every found occurrence of the target source code, the method further involves collecting key information about the matching source code files and, from the key information collected a frequency map is built that contains, for each keyword found in the key information, a keyword count value being indicative of the number of times the keyword occurs in the key information. The method may further involves applying a scoring scheme to the matching source code files based on the built frequency map (310), determining a highest score (Vmax) among the matching source code files after the scoring scheme has been applied, and determining the origin of the target source code as the matching source code file having the highest score.

17 Claims, 7 Drawing Sheets

(51) Int. Cl.
*G06F 21/57* (2013.01)
*G06F 16/14* (2019.01)
*G06F 8/70* (2018.01)
G06F 16/9535 (2019.01)
G06F 16/335 (2019.01)
G06F 16/24 (2019.01)
G06F 16/33 (2019.01)
G06F 16/38 (2019.01)
G06F 8/71 (2018.01)
G06F 16/34 (2019.01)

(52) U.S. Cl.
CPC .......... *G06F 16/24578* (2019.01); *G06F 8/71* (2013.01); *G06F 16/24* (2019.01); *G06F 16/334* (2019.01); *G06F 16/335* (2019.01); *G06F 16/3331* (2019.01); *G06F 16/34* (2019.01); *G06F 16/38* (2019.01); *G06F 16/9535* (2019.01); *G06F 2221/033* (2013.01)

(58) Field of Classification Search
CPC ...... G06F 16/38; G06F 16/9535; G06F 16/24; G06F 16/3331; G06F 16/334; G06F 16/285; G06F 8/70; G06F 8/71; G06F 2221/033
See application file for complete search history.

(56) References Cited

U.S. PATENT DOCUMENTS

2020/0327958 A1* 10/2020 Tanabe .................. G16B 20/00
2021/0224265 A1* 7/2021 Madan .................. G06N 20/00

OTHER PUBLICATIONS

Extended European Search Report (EESR) Re: European Patent Application No. 20157492.8.

* cited by examiner

US 11,500,990 B2

DETERMINING AN ORIGIN OF A TARGET SOURCE CODE FOR A COMPUTER PROGRAM OR A PART THEREOF

CROSS REFERENCE TO RELATED APPLICATIONS

This application claims priority under 35 U.S.C. § 119(b) to European Patent Application No. 20157492.8, filed on Feb. 14, 2020, the contents of which are hereby incorporated by reference.

TECHNICAL FIELD

The present invention generally relates to technical provisions for determining an origin of a target source code to be executed in a computer system, for instance for use in assessing operational stability of computer systems.

BACKGROUND

Computer systems are used virtually everywhere in modern society. As is well known, a general computer system comprises at least one processing device which is configured to execute at least one computer program being defined by at least one source code. The source code defines computer program code instructions, that may be run by the processing device to perform certain intended functionality.

Our daily lives strongly depend on computer systems being operationally stable in the sense that they must function flawlessly (i.e., perform the intended functionality without malfunctions) while remaining operational for long periods of time without interruptions. Since the source code in effect controls the behavior of the computer system, it is of paramount importance that it contains the correct computer program code instructions. With a massive code quantity in global software archives together with the open-source model for open collaboration between projects, it is becoming increasingly difficult to confirm the true origin of the code.

Software vulnerabilities and toxic code snippets are being discovered and recorded, both constantly and massively, in global software archives. When a vulnerability is found in an application or a software library, the authors of the code are typically responsible for having well-defined processes to share the relevant information to anyone importing and operating on this code. This information needs to be shared immediately, since it may affect critical security flaws of the code. If a code snippet has been imported from a third party source, this source is not necessarily obliged to share the relevant information, and is much less likely to have a well-defined process for communicating information to code importers. Additionally, outdated and license-violating online code clones are much less likely to be communicated.

Hence, as the validity of the author or organization behind the code in operation may not be credible, operational stability may not be ensured for an operator, host or user of a computer system importing this code.

It may, however, be far from trivial for the operator, host or user to correctly monitor, audit or validate the origins of imported files due to a potentially massive project with a large amount of code contributors. If the origin of the code in a program is unknown, security of the program can't be guaranteed.

In light of the observations above, the present inventor has realized that there is room for improvements when it comes to technical provisions for assessing operational stability of computer systems.

SUMMARY

It is accordingly an object of the invention to eliminate or alleviate at least some of the problems or drawbacks referred to above.

A first aspect of the present invention therefore is a computer-implemented method for determining an origin of a target source code for a computer program or a part thereof. The method involves:

for every found occurrence of the target source code, collecting key information about the matching source code file;

from the key information collected for all matching source code files, building a frequency map that contains, for each keyword found in the key information, a keyword count value being indicative of the number of times the keyword occurs in the key information;

applying a scoring scheme to the matching source code files based on the built frequency map;

determining a highest score among the matching source code files after the scoring scheme has been applied; and determining the origin of the target source code as the matching source code file having the highest score.

As used herein, "target source code" refers to an arbitrary piece or snippet of source code for a computer program or a part thereof, the operational stability of which is to be assessed by means of the present invention. "Computer program" accordingly refers to the computer program executing the target source code and "a part thereof" refers to instructions, libraries or related data of the computer program. "Software archives" refer to publically available open source libraries managing and storing large quantities of computer source code from a code space created and modified by a plurality of e.g. software developers, coders, enthusiasts and other professionals. Software archives typically offer distributed version control of programs and store key information of a program such as for example authors, repository names, filenames and resource locations. The software archives may be stored for online or offline access through a variety of search engines. Additionally, software archives may manage repository licenses and versions.

The invention is based on the inventive understanding that the operational stability of a computer system can be assessed by determining and analyzing the origin of a target source code to be executed in a computer system.

Upon applying the scoring scheme, a score will be calculated which effectively and reliably distinguishes the origin of the target source code from e.g. other third party sources. As a result, code owners, developers, companies and other stakeholders may be assisted in performing key decisions regarding operational stability of the computer program.

In one embodiment of the invention, the key information of the matching source code files includes at least one of author, repository name, filename or resource location of the matching source code files.

In another embodiment of the invention, applying the scoring scheme to the built frequency map involves:

for each of the matching source code files, calculating a score based on adding the keyword count of the author of the matching source code file with the keyword count of the repository name of the matching source code file, wherein the keyword count values being retrieved from the frequency map.

In another embodiment of the invention, applying the scoring scheme to the built frequency map further involves lowering the score if key information of a matching source code file contains dependent keywords which frequently occurs in dependent software archives.

In another embodiment of the invention, applying the scoring scheme to the built frequency map further involves lowering the score if details are missing in the matching source code file such as one or more key information entries, license number or version number.

The scoring scheme of the present invention provides several advantages regarding accuracy. When assessing the relevancy of the matches, the user may be assured that the score reflects all of the matching source code files. In other words, no potential target origins are overlooked. Additionally, as the scoring scheme in embodiments of the invention takes dependencies and lack of important details into account, the user may therefore assess the operational stability of the computer system credibly.

In another embodiment of the invention, the computer-implemented method further comprising, after said step of selecting and retrieving the origin of the target source code for a computer program or a part thereof, returning at least one of author, repository name, filename or resource location of the matching source code file as a response to the computer-implemented method having determined the origin of the target source code.

A second aspect of the invention is an apparatus for determining an origin of a target source code for a computer program or a part thereof. The apparatus comprises a processing device which is configured for performing the computer-implemented method according to the first aspect of the invention.

A third aspect of the invention is computer program product comprising computer program code for performing the computer-implemented method according to the first aspect of the invention when the computer program code is executed by a processing device.

A fourth aspect of the invention is a computer readable medium having stored thereon a computer program comprising computer program code for performing the computer-implemented method according to the first aspect of the invention when the computer program code is executed by a processing device.

The provision of a computer-implemented method, apparatus, computer program product and computer readable medium as disclosed herein will solve or at least mitigate one or more of the problems or drawbacks identified in the background section of this document. These and other aspects, objectives, features and advantages of the invention and its disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something, or "capable of" doing something in this document is intended to mean the same as the entity being "arranged for", "configured for" or "adapted for" doing this very something, and vice versa.

DETAILED DESCRIPTION

Figure 1:
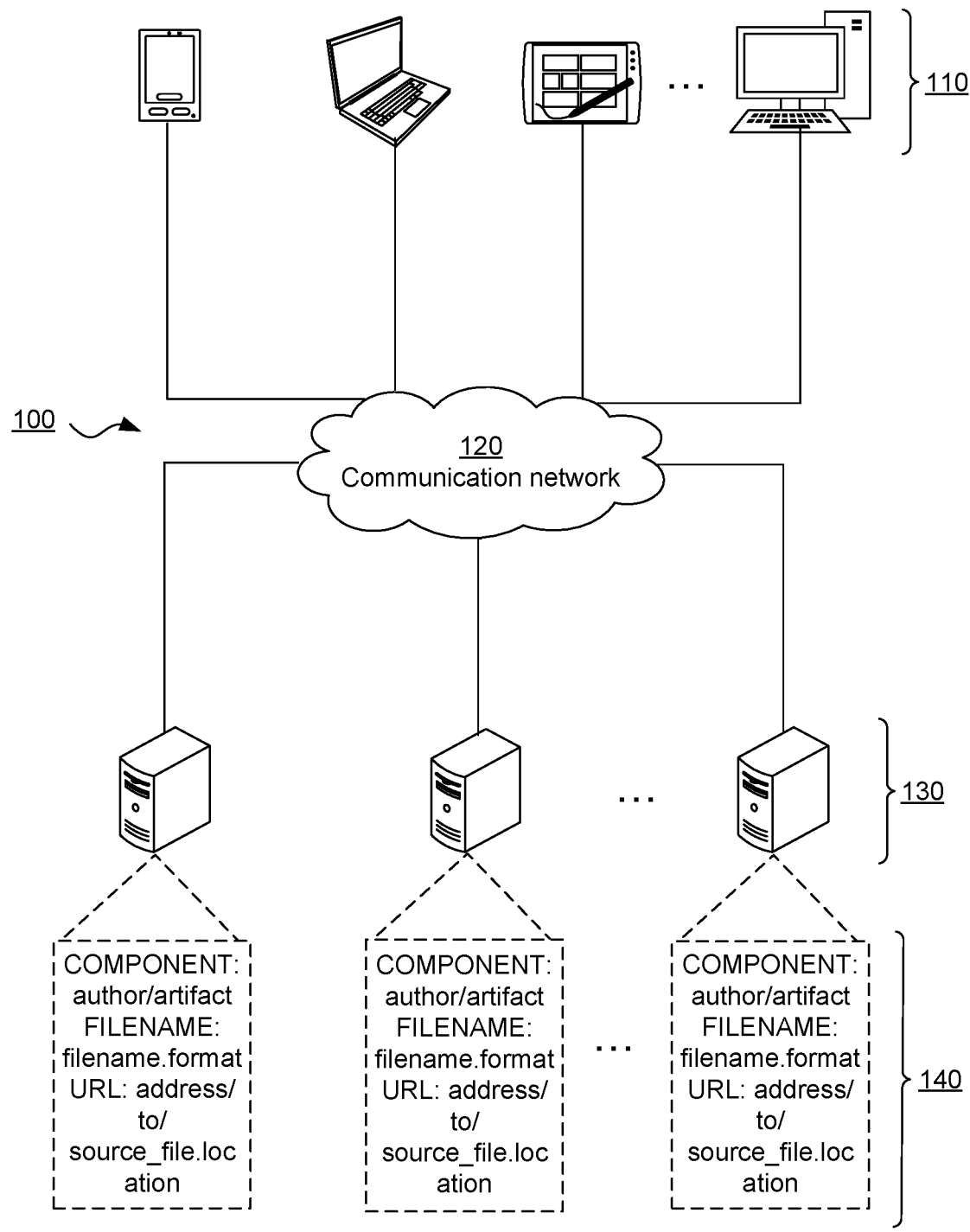
FIG. 1 illustrates various kinds of computing devices communicating with a general computer network.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 illustrates a general computer network 100 that comprises various kinds of computing devices 110, 130. The computing devices include typical end-user devices 110, or client devices, such as tablet computers (e.g. surf pads), mobile terminals (e.g. smartphones or personal digital assistants), or personal computers (e.g. laptops, personal computers or workstations). The computing devices also include typical server devices 110, which may be physically separable devices, or distributed (e.g. cloud-based) computing resources, or a combination thereof.

The computing devices 110, 130 communicate by wireless and/or wired networked communication, illustrated in a simplified manner in the form of one common communication network 120. The wireless networked communication may include one or more of WIFI, Bluetooth®, W-CDMA, GSM, UTRAN, HSPA, LTE and LTE Advanced, to name a few. The wired networked communication may include one or more of USB, Ethernet or TCP/IP, to name a few. The communication network 120 may be the Internet or a part thereof.

Figure 2A:
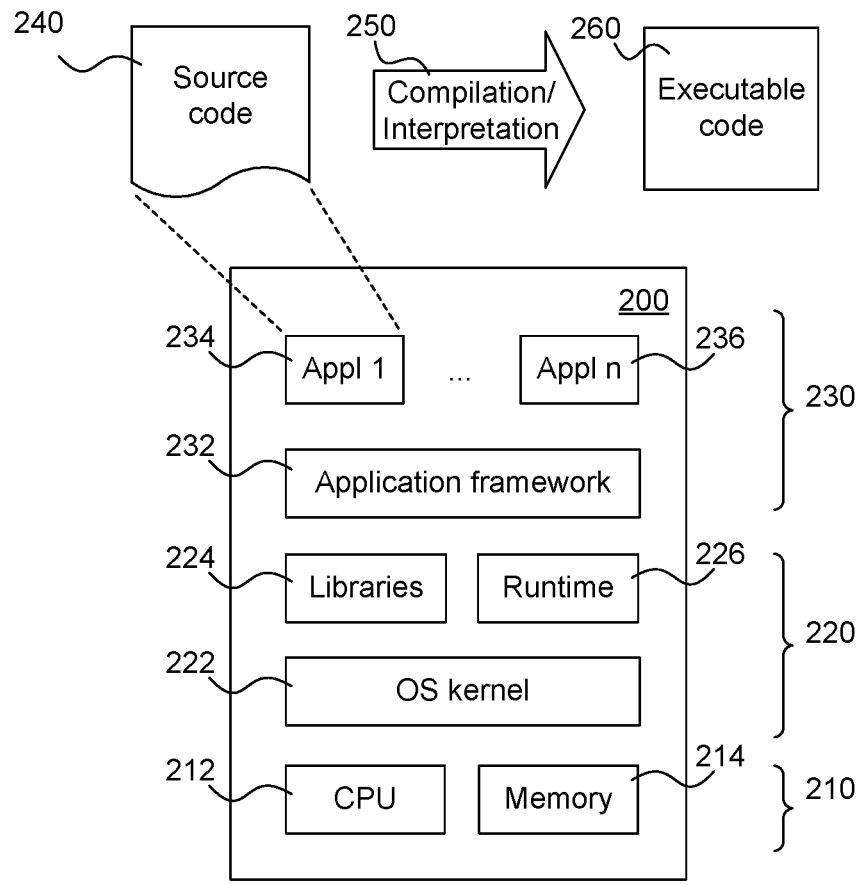
FIG. 2A is a schematic block diagram of some typical components of a general computer system, for instance any of the computing devices shown in FIG. 1.

FIG. 2A is a schematic block diagram of some typical components of a general computer system 200. The computer system 200 may, for instance, be any of the types of computing devices 110, 130 shown in FIG. 1. As seen in FIG. 2A, the computer system 200 comprises a processing device 212 (or a cooperative plurality of such processing devices) and a memory 214 (or a cooperative plurality of such memories).

The processing device 212 is responsible for the overall operation of the computer system 200 and is preferably implemented by any commercially available CPU ("Central Processing Unit"), DSP ("Digital Signal Processor") or any other electronic programmable logic device. The processing device 212 is configured to read instructions from the memory 214 and execute these instructions to control the operation of the computer system 200. The memory 214 may be implemented using any commonly known technology for computer-readable memories such as ROM, RAM, SRAM, DRAM, CMOS, FLASH, DDR, EEPROM memory, flash memory, hard drive, optical storage or any combination thereof.

The processing device 212 and the memory 214 can be seen as a hardware layer 210 of the computer system 200. The computer system 200 further has a software architecture which includes an operating system layer 220 and an application program layer 230. The operating system layer 220 includes an operating system (OS) kernel 222, various code libraries 224, and a runtime 226. The application program layer 230 comprises an application framework 232 that supports various application programs 234-236. For exemplifying purposes in the present description, it is assumed that the application program 234 is the target computer program. The origin 304 of the source code being executed from the application program 234 by the processing device 212 of the computer system 200 is determined by means of the present invention. The operating system may, for instance, be Apple OSX, Microsoft Windows, Unix, Android or Apple iOS.

The application program 234 is defined by source code 240. As seen at 250, compilation or interpretation will generate executable code 260 from the source code. The executable code will contain sets of instructions that when executed by the processing device 212 will control the operation of the computer system 200 by performing the functionality intended by the application program 234.

Needless to say, the computer system 200 may typically comprise user interface devices (particularly when the computer system 200 is an end-user (client device like 110 in FIG. 1), and communication interface devices being adapted to allow the computer system 200 to communicate with other devices through the use wired or wireless communication, for instance as described above for FIG. 1. Moreover, the components of the computer system 200 may be distributed over more than one physical device, such as in a client-server or cloud computing architecture. Accordingly, the computer system is not limited to being merely a single physical device.

Figure 2B:
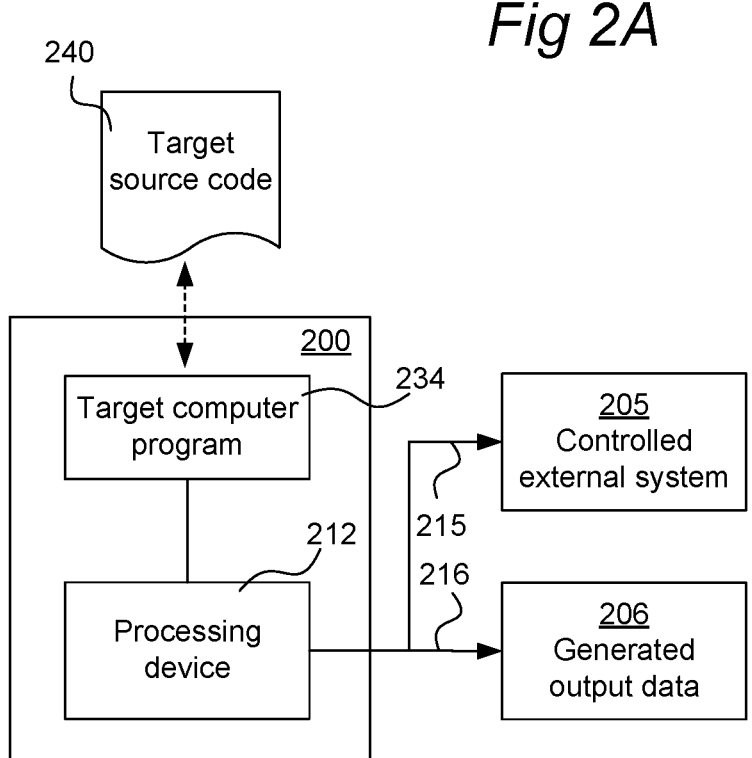
FIG. 2B is a schematic illustration of a computer system adapted to execute a target computer program, the target computer program having a target source code.

FIG. 2B is a schematic illustration of a computer system 200 that comprises a processing device 212 being adapted to execute a target computer program 234 having a target source code 240. One possible task of the computer system 200 when executing the target computer program 234 may be to control an external system 205 by generating control signals 215. The external system 205 may, for instance, be an industrial process or plant, or technical equipment in a private home or a public building, etc. As already discussed in the background section of this document, the computer system needs to be operationally stable by functioning flawlessly while remaining operational for long periods of time without interruptions. This requires the target computer program 234 to perform the intended functionality without malfunctions, bugs or malicious activity, i.e. to have operational stability. Since it is the target source code 240 that defines the target computer program 234 and therefore in effect controls the behavior of the computer system 200, the target source code 240 must contain the correct computer program code instructions and nothing else. As was explained in the background section, however, the target source code 240 may be written in different ways by different software developers, and it may undergo code modifications, partial code deletions, code rearrangements, code mergers, etc., over time.

Another possible task of the computer system 200 when executing the target computer program 234 may be to generate output data 206 by generating control signals 216. The output data may represent key information for use by other technical systems or human readers. For similar reasons as were given above, it is typically quite important that the generated output data 206 is correct and free from errors. Again, the target computer program 234 should perform the intended functionality without malfunctions, bugs or malicious activity, i.e. have operational stability.

Figure 2C:
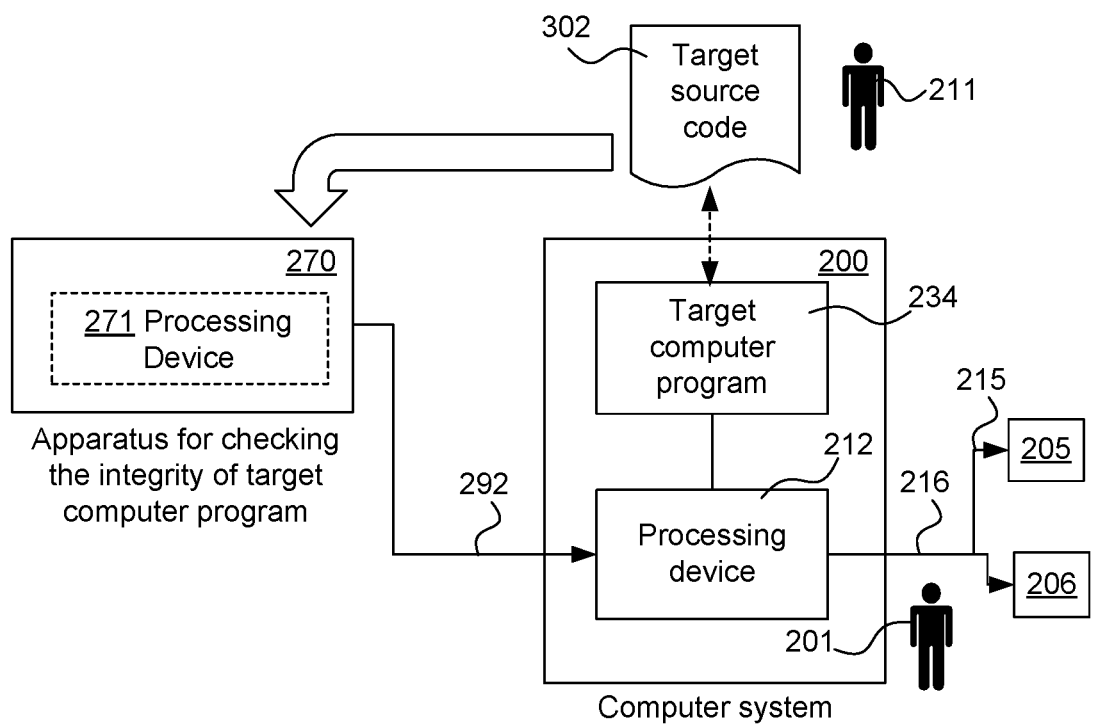
FIG. 2C is a schematic illustration of an apparatus for determining an origin of a target source code for a computer program or a part thereof, for instance the computer system in FIG. 2B.

FIG. 2C is a schematic illustration of an apparatus 270 for determining an origin 304 of a target source code 302 for the computer program 234. The apparatus 270 comprises a processing device 271 which is configured for performing functionality of a computer-implemented method 400. The method 400 is illustrated in more detail as a flowchart diagram in FIG. 4.

In some embodiments, the processing device 271 of the apparatus 270 is implemented by customized hardware (such as, for instance, an ASIC or FPGA). In other embodiments it may be implemented by a general-purpose processor (such as, for instance, a CPU or DSP) being programmed by software customized to perform the functionality of the method 400 as described herein.

Figure 4:
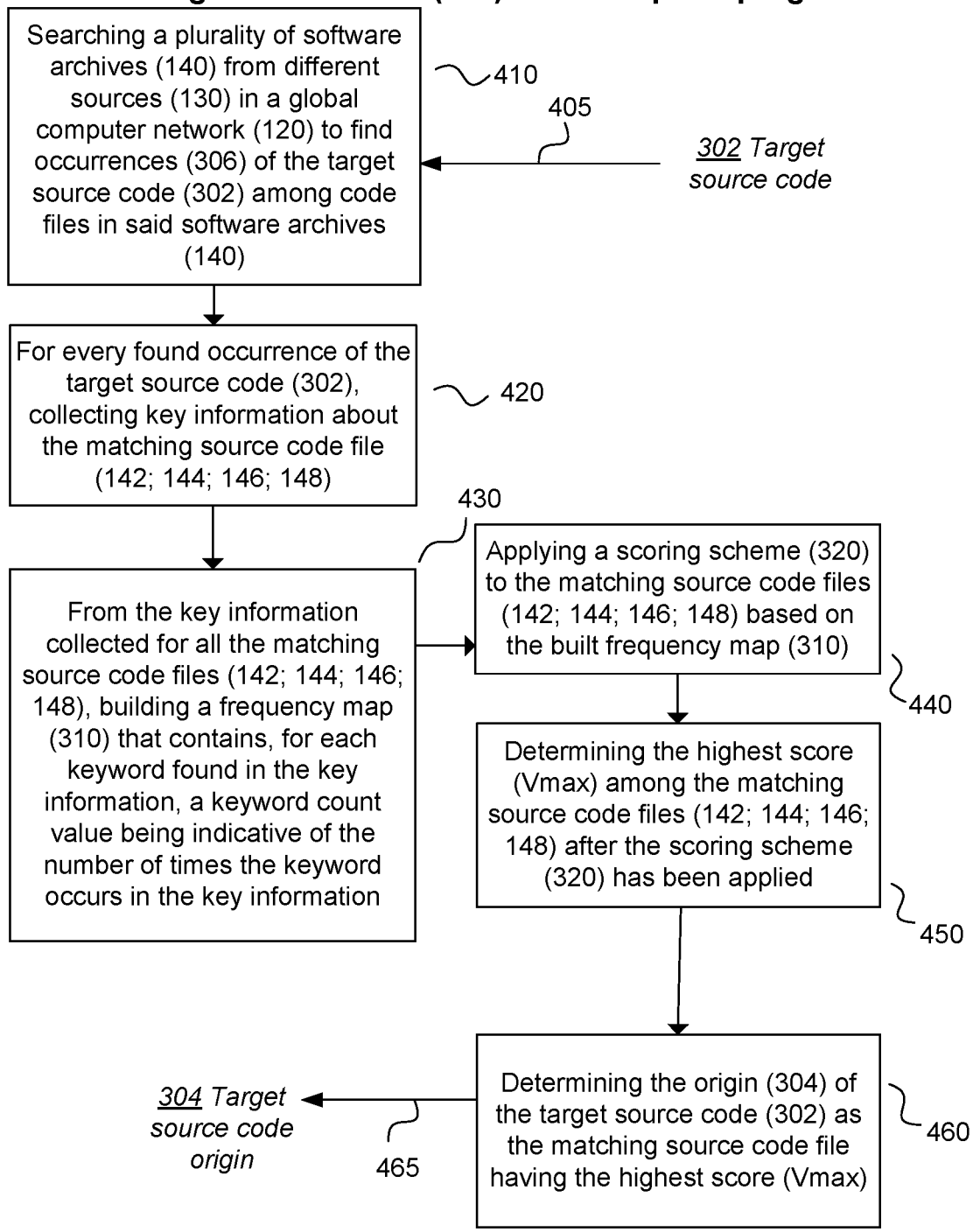
FIG. 4 is a flowchart diagram that illustrates a computer-implemented method for determining an origin of a target source code for a computer program or a part thereof.

The processing device 271 takes the target source code 302 as input and determines the origin 304 of the target source code 302 for the computer program 234 in accordance with the computer-implemented method 400 in FIG. 4, a detailed explanation of which will follow in subsequent passages of this document.

The apparatus 270 may be used for assessing operational stability of the computer system 200. After the processing device 271 of the apparatus 270 has determined the origin of the target source code, the processing device 271 may generate a control signal 292 for the computer system 200 to prevent execution of the target computer program 234 if operational stability can't be guaranteed for the target computer program 234. This is advantageous since it may prevent hazards from occurring at the controlled external system 205 as a result of the origin 304 of the target source code 302 being untrusted.

Figure 3A:
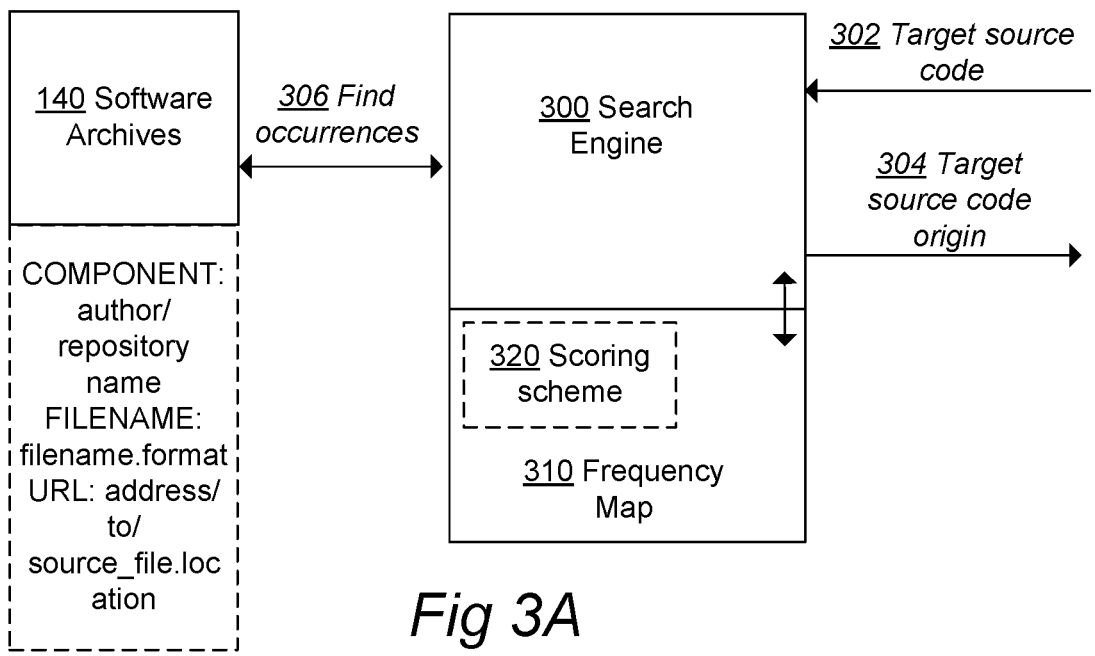
FIG. 3A is a general block diagram schematic illustration of the primary inventive aspects of the invention, including computer system input and output.
Figure 3B:
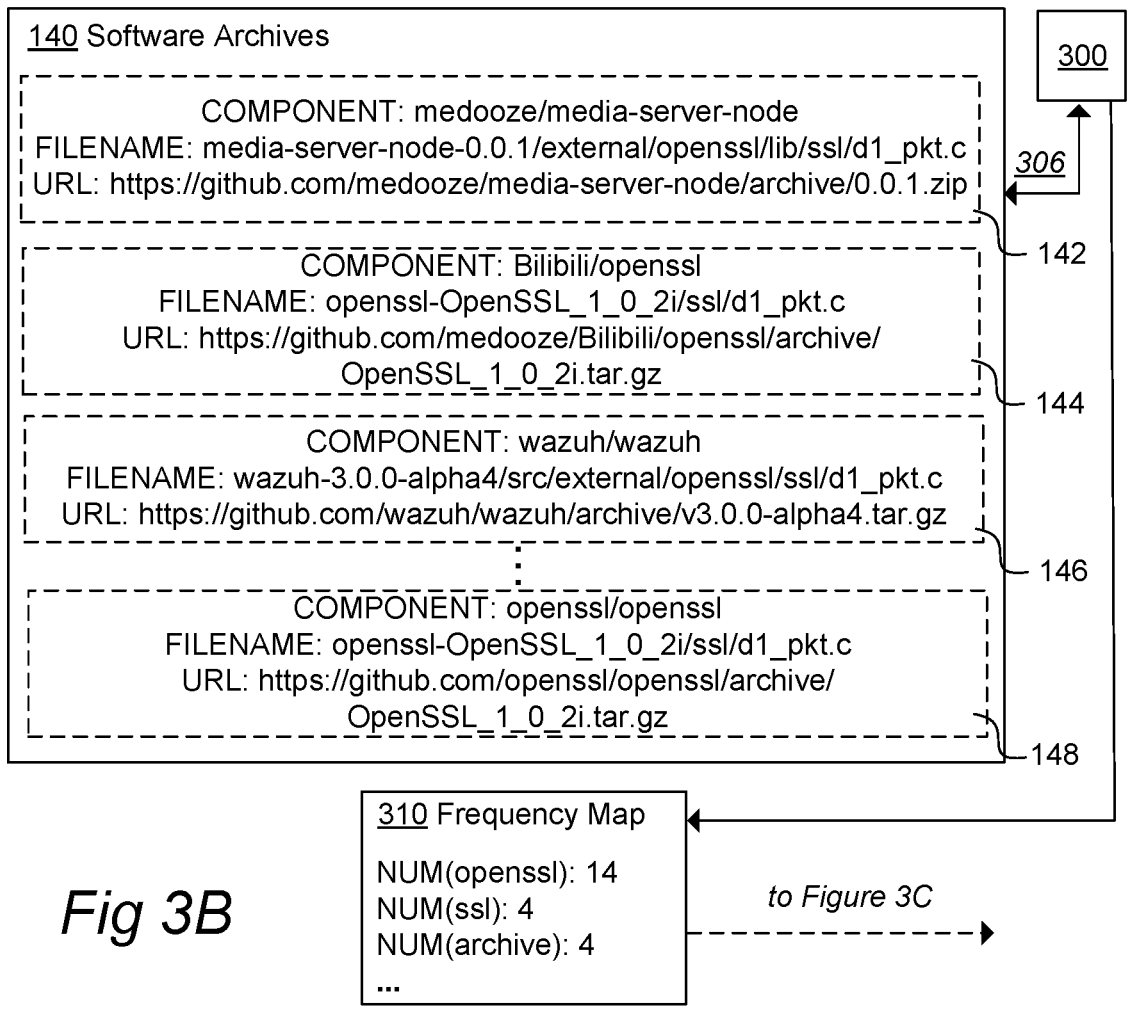
FIG. 3B is a schematic illustration of how a frequency map is built from matching source code files in software archives.
Figure 3C:
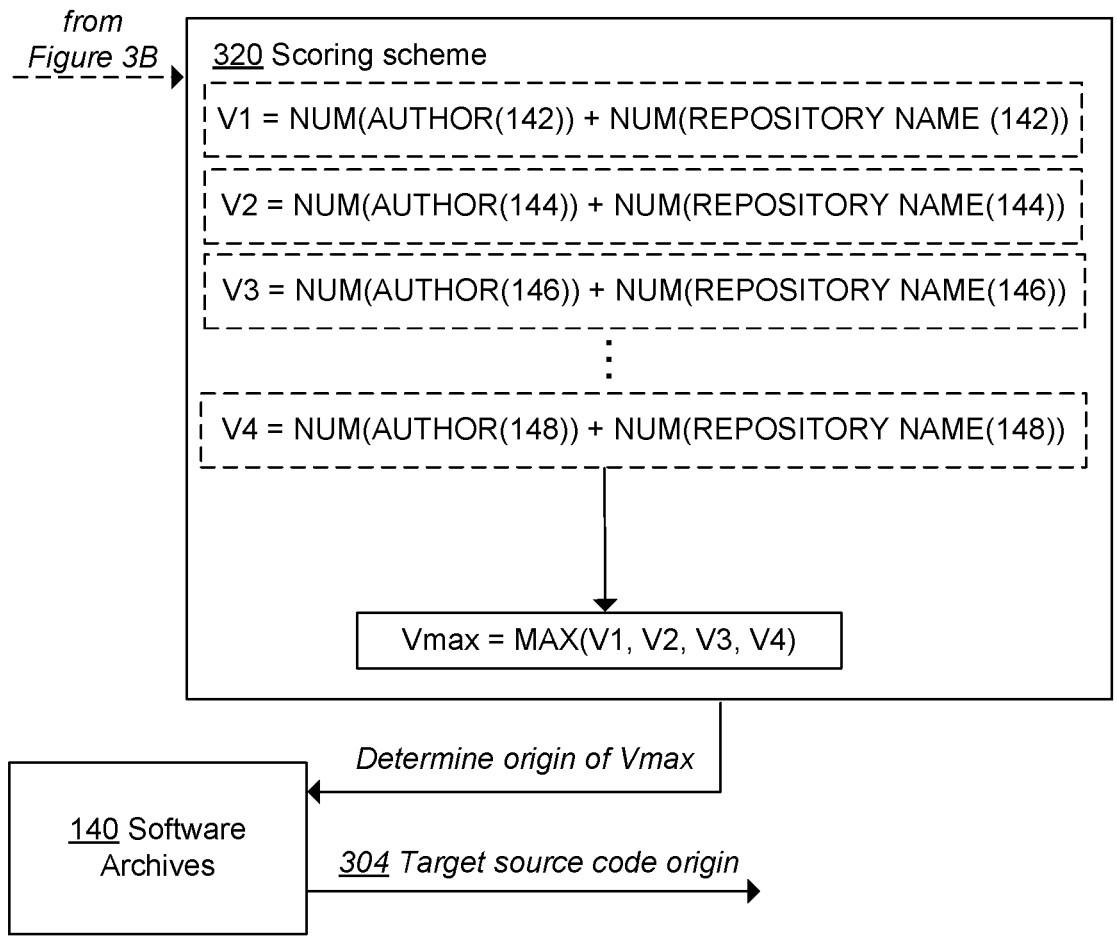
FIG. 3C is a schematic illustration of how a scoring scheme is applied to the matching source code files based on the frequency map from FIG. 3B.

FIGS. 3A to 3C cover a preferred embodiment of the methodology of how the origin 304 of the target source code 302 may be determined by inputting the target source code 302, finding target source code occurrences in software archives 140 in the form of matching source code files, building a frequency map 310 of the found occurrences, applying a scoring scheme 320 to the matching source code files based on the built frequency map 310, and returning information about the origin 304 of the target source code 302 to, for example, an end-user device 110, a user or operator 201 of the computer system 200 in FIG. 2C, or a developer 211 of the target source code 302 (also see FIG. 2C).

FIG. 3A is a general block diagram schematic illustration of the primary inventive aspects of the invention including computer system input and output with a plurality of responsible computer components. A target source code 302, typically comprising one or more code files, code pieces or code snippets, is provided for a search engine 300 by e.g. an end-user device 110, user 201 or developer 211. In some embodiments, the search engine 300 is designed to carry out web searches in a systematic way to obtain particular information specified in a web search query. The search engine 300 may for example be a crawler based search engine such as Google, Bing or Yahoo!, or human powered directories such as Yahoo! Directory or DMOZ. The search engine 300 is responsible for searching through a large number of software files in a large number of software archives 140 in a global computerized network, for example the network as explained in FIG. 1. Alternatively or additionally, the search engine 300 may also operate offline on massive software archives which have been collected and downloaded in advance and stored in a local data repository.

Searching through software archives 140 may be executed efficiently by having a search engine 300 capable of performing distributed searches simultaneously to a plurality of software archives 140 from different sources in order to quickly locate important information in a large search space. When target source code occurrences have been found 306, the search engine 300 collects key information about the matching source code files 142; 144; 146; 148, and a frequency map 310 is built based on the collected key information. The frequency map 310 calculates a keyword count value, indicative of the number of times the keyword occurs in the key information of each matching source code file 142; 144; 146; 148. The key information is collected as one or more keywords from a plurality of attributes of the matching source code file and/or the software archive 140 in which it was found. For instance, the key information may comprise at least one of author, repository name, filename or resource location of the matching source code file 142; 144; 146; 148. A resource location may for instance comprise a path to where the resource resides in public or private clouds, branch offices, data storages, data centers or other virtual locations.

Subsequently, once the frequency map 310 has been built, a scoring scheme 320 is applied to the matching source code files based on the frequency map 310. The scoring scheme 320 involves:

For each of the matching source code files 142; 144; 146; 148 in the frequency map 310, calculating a score V1; V2; V3; V4 based on adding the keyword count of the author of the matching source code file 142; 144; 146; 148 and the keyword count of the repository name of the same matching source code file 142; 144; 146; 148, wherein the keyword count values being retrieved from the frequency map 310.

Additionally, the score V1; V2; V3; V4 may be lowered if key information of a matching source code file 142; 144; 146; 148 contains dependent keywords which frequently occurs in dependent software archives. These words may for example be, but not limited to being, one of "deps", "third-party", "external", or the like.

The score V1; V2; V3; V4 may also be lowered if details are missing in the matching source code file 142; 144; 146; 148 such as one or more key information entries, license number or version number.

Finally, once the scoring scheme 320 has been applied, the origin 304 of the target source code 302 representing the highest score Vmax of the entries in the frequency map 310 will be returned by the computer system. At least one of author, repository name, filename or resource location of the origin 304 of the target source code 302 is to be returned.

FIG. 3B is a schematic illustration of how a frequency map 310 is built from the matching source code files 142; 144; 146; 148 in the software archives 140. It should be clear that the embodiment shown in FIG. 3B and FIG. 3C is just one example of a method for determining an origin of a target source code where specific example data have been used. In practice, the search engine 300 may find an arbitrary number of found occurrences among the software archives 140. In the example provided, the end-user device 110 wants to discover the origin 304 of the target source code 302: "d1_pkt.c". The search engine 300 finds four matching source code files 142; 144; 146; 148, and a frequency map 310 is built comprising the count of each relevant keyword.

In order for the frequency map 310 to make sense of the data given by the matching source code files 142; 144; 146; 148, the retrieved data are expected to go through a pipeline of text processing modules, as a way to prepare the data for keyword frequency calculation. Herein, a variety of data preprocessing techniques may be performed. The different fields of each found source code file 142; 144; 146; 148 are processed by e.g. a data parser, wherein all relevant keywords are being retrieved and data noise and inconsistencies are filtered. Given the example shown in FIG. 3B, instructions given to the parser may for example be to eliminate cardinal numbers, punctuations, multiple whitespaces as well as other regular expressions (regex) not contributing to any meaningful information such as e.g. slashes, underscores or asterisks.

The data preprocessing can be done in different ways. For instance, an algorithm may have been developed for iterating a global archive of found file occurrences, which may be based on set instructions made by the programmer or a human user. Additionally, a software program based on unsupervised learning algorithms looking for hidden structures behind the data may have been implemented.

In this example, the keyword "archive" has been found four times, the keyword "ssl" has been found four times, and the keyword "openssl" has been found 14 times. The frequency map also contains additional words such as "github", "tar", "gz" not shown in the example. These words typically contribute to data inconsistencies, and have therefore been filtered by the parser using techniques for e.g. removing stop words and frequently occurring words, or similar data preprocessing technology.

Given the keyword count from the frequency map 310 in FIG. 3B, FIG. 3C is a schematic illustration of how a scoring scheme 320 is applied to the frequency map 310. Herein, a score is calculated for each matching source code files 142; 144; 146; 148, and a highest score Vmax is determined. In the example provided, the fourth matching source code file 148 will be given the highest score, since both the name of the author and the name of the repository is "openssl". Thus, the score V4 and consequently the highest score Vmax will be calculated as 14+14=28. Finally, the at least author, repository name, filename or resource location of the matching source code file 148 corresponding to the highest score Vmax is determined from the software archives 140 and returned to the end-user device 110.

FIG. 4 is a flowchart diagram that illustrates a computer-implemented method for determining an origin of a target source code for a computer program or a part thereof. The steps shown in FIG. 4 are not necessarily performed sequentially, as for example system input and output latency may affect certain steps of the method. The method comprises an initial step of receiving a request 405 for determining the origin 304 of the target source code 302. The method further involves searching a plurality of software archives 140 from different sources 130 in a global computer network 120 to find occurrences 306 of the target source code 302 among code files in said software archives 140. For every found occurrence of the target source code 302, the method further involves collecting key information about the matching source code file 142; 144; 146; 148. Moreover, the method involves, for all collected key information about the matching source code file 142; 144; 146; 148 of the target source code 302, building a frequency map 310 of the key information, wherein the frequency map contains, for each keyword found in the key information of each matching source code files 142; 144; 146; 148, a keyword count value, indicative of the number of times the keyword occurs in the key information. The method further involves applying a scoring scheme 320 to the matching source code files 142; 144; 146; 148 based on the built frequency map 310, determining a highest score Vmax among the matching source code files 142; 144; 146; 148 after the scoring scheme (320) has been applied, and determining the origin 304 of the target source code 302 as the matching source code file having the highest score Vmax. Finally, the method comprises a concluding step 465 of returning at least one of author, repository name, filename or resource location of the matching source code file 142; 144; 146; 148 in response to said request 405. A target source code origin 304 is provided from the computer system 200.

Figure 5:
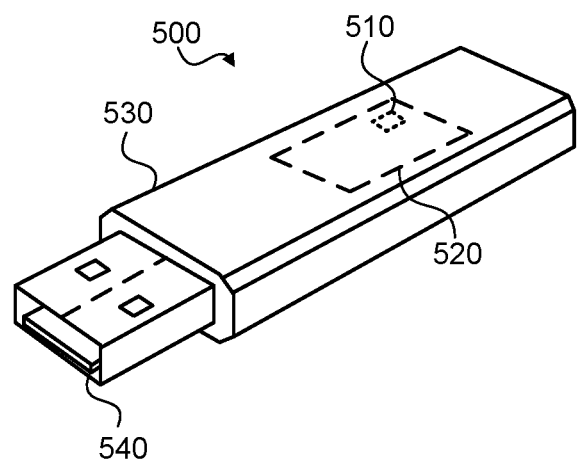
FIG. 5 is a schematic illustration of a computer-readable medium in one exemplary embodiment, capable of storing a computer program product.

FIG. 5 is a schematic illustration of a computer-readable medium 500 in one exemplary embodiment, capable of storing a computer program product 510. The computer-readable medium 500 in the disclosed embodiment is a memory stick, such as a Universal Serial Bus (USB) stick. The USB stick 500 comprises a housing 530 having an interface, such as a connector 540, and a memory chip 520. In the disclosed embodiment, the memory chip 520 is a flash memory, i.e. a non-volatile data storage that can be electrically erased and re-programmed. The memory chip 520 stores the computer program product 510 which is programmed with computer program code (instructions) that when loaded into a processing device, such as the processing device 212 or 271 as described above, will perform a method 400 according to any or all of the embodiments disclosed above. The USB stick 500 is arranged to be connected to and read by a reading device for loading the instructions into the processing device. It should be noted that a computer-readable medium can also be other mediums such as compact discs, digital video discs, hard drives or other memory technologies commonly used. The computer program code (instructions) can also be downloaded from the computer-readable medium via a wireless interface to be loaded into the processing device.

References to a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has been described above in detail with reference to embodiments thereof. However, as is readily understood by those skilled in the art, other embodiments are equally possible within the scope of the present invention, as defined by the appended claims.

What is claimed is:

1. A computer-implemented method for determining an origin of a target source code for a computer program or a part thereof, the method involving:
   searching a plurality of software archives from different sources in a global computer network to find occurrences of the target source code among source code files in said software archives;
   for every found occurrence of the target source code, collecting key information about the matching source code file;
   from the key information collected for all matching source code files, building a frequency map that contains, for each keyword found in the key information, a keyword count value being indicative of the number of times the keyword occurs in the key information;
   applying a scoring scheme to the matching source code files based on the built frequency map;
   determining a highest score among the matching source code files after the scoring scheme has been applied; and
   determining the origin of the target source code as the matching source code file having the highest score.

2. The computer-implemented method as defined in claim 1, wherein the key information about each matching source code file is collected as one or more keywords from a plurality of attributes of the matching source code file and/or the software archive in which it was found.

3. The computer-implemented method as defined in claim 2, wherein the plurality of attributes includes at least two of the following: an author, a repository name, a filename and a resource location of the matching source code file and/or the software archive in which it was found.

4. The computer-implemented method as defined in claim 2, wherein applying the scoring scheme to the matching source code files based on the built frequency map involves, for each of the matching source code files:
   calculating a score based on keyword count values for keywords appearing in some or all of the attributes of the matching source code file and/or the software archive in which it was found, wherein keyword count values for keywords appearing in a first attribute among said attributes are given more weight than keyword count values for keywords appearing in a second attribute among said attributes.

5. The computer-implemented method as defined in claim 3, wherein applying the scoring scheme to the matching source code files based on the built frequency map involves:
   for each of the matching source code files, calculating a score based on adding the keyword count value of the author of the matching source code file and the keyword count value of the repository name of the same matching source code file, the keyword count values being retrieved from the frequency map.

6. The computer-implemented method as defined in claim 4, wherein applying the scoring scheme to the matching source code files based on the built frequency map further involves:

lowering the score if key information of a matching source code file contains dependent keywords which typically occur in dependent software archives.

7. The computer-implemented method as defined in claim 4, wherein applying the scoring scheme to the matching source code files based on the built frequency map further involves:

lowering the score if details are missing in the matching source code file, such as one or more key information entries, license number or version number.

8. The computer-implemented method as defined in claim 1, wherein the method comprises an initial step of receiving a request for determining the origin of the target source code, and wherein the method further comprises a concluding step of returning at least one of author, repository name, filename or resource location of the matching source code file, and/or the software archive in which it was found, in a response to said request.

9. An apparatus for determining an origin of a target source code for a computer program or a part thereof, the apparatus comprising a processing device configured for:

searching a plurality of software archives from different sources in a global computer network to find occurrences of the target source code among source code files in said software archives;

for every found occurrence of the target source code, collecting key information about the matching source code file;

from the key information collected for all matching source code files, building a frequency map that contains, for each keyword found in the key information, a keyword count value being indicative of the number of times the keyword occurs in the key information;

applying a scoring scheme to the matching source code files based on the built frequency map;

determining a highest score among the matching source code files after the scoring scheme has been applied; and determining the origin of the target source code as the matching source code file having the highest score.

10. The apparatus as defined in claim 9, wherein the processing device is further configured for collecting the key information about each matching source code file as one or more keywords from a plurality of attributes of the matching source code file and/or the software archive in which it was found.

11. The apparatus as defined in claim 10, wherein the plurality of attributes includes at least two of the following: an author, a repository name, a filename and a resource location of the matching source code file and/or the software archive in which it was found.

12. The apparatus as defined in claim 10, wherein the processing device is configured for applying the scoring scheme to the matching source code files based on the built frequency map by, for each of the matching source code files:

calculating a score based on keyword count values for keywords appearing in some or all of the attributes of the matching source code file and/or the software archive in which it was found, wherein keyword count values for keywords appearing in a first attribute among said attributes are given more weight than keyword count values for keywords appearing in a second attribute among said attributes.

13. The apparatus as defined in claim 11, wherein the processing device is configured for applying the scoring scheme to the matching source code files based on the built frequency by:

for each of the matching source code files, calculating a score based on adding the keyword count value of the author of the matching source code file and the keyword count value of the repository name of the same matching source code file, the keyword count values being retrieved from the frequency map.

14. The apparatus as defined in claim 12, wherein the processing device is further configured for applying the scoring scheme to the matching source code files based on the built frequency map by:

lowering the score if key information of a matching source code file contains dependent keywords which typically occur in dependent software archives.

15. The apparatus as defined in claim 12, wherein the processing device is further configured for applying the scoring scheme to the matching source code files based on the built frequency map by:

lowering the score if details are missing in the matching source code file, such as one or more key information entries, license number or version number.

16. The apparatus as defined in claim 9, wherein the processing device is further configured for performing an initial step of receiving a request for determining the origin of the target source code, and wherein the processing device is further configured for performing a concluding step of returning at least one of author, repository name, filename or resource location of the matching source code file, and/or the software archive in which it was found, in a response to said request.

17. A computer readable medium having stored thereon a computer program comprising computer program code for performing the method according to claim 1 when the computer program code is executed by a processing device.

* * * * *